United States Patent [19]

Zimmer

[11] Patent Number: 4,706,510
[45] Date of Patent: Nov. 17, 1987

[54] PROTECTIVE DEVICE FOR GUIDE TRACK BETWEEN TWO RELATIVELY MOVABLE MACHINE PARTS

[75] Inventor: Ernst Zimmer, Friedberg, Fed. Rep. of Germany

[73] Assignee: Kuka Schweissanlagen & Roboter GmbH, Fed. Rep. of Germany

[21] Appl. No.: 828,325

[22] PCT Filed: Jun. 4, 1985

[86] PCT No.: PCT/EP85/00266
§ 371 Date: Jan. 28, 1986
§ 102(e) Date: Jan. 28, 1986

[87] PCT Pub. No.: WO85/05586
PCT Pub. Date: Dec. 19, 1985

[30] Foreign Application Priority Data
Jun. 5, 1984 [DE] Fed. Rep. of Germany ...... 3420936

[51] Int. Cl.$^4$ .................. F16H 19/02; G05G 1/00
[52] U.S. Cl. ...................... 74/89.21; 74/566; 384/15
[58] Field of Search .......... 74/89.2, 89.21, 89.22, 74/566; 384/15, 55, 56

[56] References Cited

U.S. PATENT DOCUMENTS

| 971,146 | 9/1910 | Repp | 74/566 |
|---|---|---|---|
| 1,679,912 | 8/1928 | Monoloch | 74/566 |
| 1,871,167 | 8/1932 | Farrell et al. | 74/566 |
| 1,895,122 | 1/1933 | Benedict | 384/15 |
| 1,937,985 | 12/1933 | Schnuck | 384/15 |
| 2,033,141 | 3/1936 | Kraut et al. | 384/15 |
| 2,190,213 | 2/1940 | Meyer | 384/15 |
| 2,760,571 | 8/1956 | Dayton | 74/566 |
| 2,881,834 | 4/1959 | Thumm | 74/566 |
| 2,951,728 | 9/1960 | Drake | 384/15 |
| 3,552,805 | 1/1971 | Dunlap | 384/58 |
| 3,679,174 | 7/1972 | Boettcher | 74/89.21 |
| 3,828,615 | 8/1974 | O'Connor | 74/89.22 |
| 3,850,043 | 11/1974 | Tarbox | 74/89.2 |
| 4,512,208 | 4/1985 | Lipinski et al. | 74/566 |

FOREIGN PATENT DOCUMENTS

| 743259 | 12/1943 | Fed. Rep. of Germany . | |
| 1101096 | 3/1961 | Fed. Rep. of Germany . | |
| 1291178 | 11/1969 | Fed. Rep. of Germany . | |
| 2201492 | 7/1973 | Fed. Rep. of Germany . | |
| 2946825 | 5/1981 | Fed. Rep. of Germany . | |
| 883528 | 7/1943 | France | 384/15 |
| 2451517 | 10/1980 | France . | |
| 5642758 | 4/1981 | Japan | 74/89.2 |
| 671872 | 5/1952 | United Kingdom | 384/15 |
| 2112350 | 7/1983 | United Kingdom . | |

Primary Examiner—Lawrence J. Staab
Attorney, Agent, or Firm—McGlew and Tuttle

[57] ABSTRACT

The invention relates to the production of a guidance system (9, 14) for two machine parts (1, 2) which are movable relative to each other and are interconnected through this guidance system. To protect this guide track (9) disposed on the first machine part (1) from the track dust, grease, oil and the like, it is disposed in an almost completely closed guide channel. This guide channel is accessible only from the top through a slot engaged by guide elements (14) of the other machine part (2). The slot is covered on the one hand by the housing of machine part (2), and in the area outside of this housing it is closed by a belt (4). The guide track (9) is thus closed to the outside in any position of the machine part (2). If a toothed belt drive (3) is used, the toothed belt (4) acts as driving and covering element at the same time.

6 Claims, 10 Drawing Figures

PROTECTIVE DEVICE FOR GUIDE TRACK BETWEEN TWO RELATIVELY MOVABLE MACHINE PARTS

The invention relates to a protective device for protecting the guide track of one machine part which receives a guiding element of another machine part that is mounted for movement on the one machine part.

If the two machine parts are to be moved relative to each other with great accuracy, such as is the case with manipulators, for instance, there is the problem that the guide surfaces must be protected from contamination; in particular from deposits of dust, grease, oil, etc. Such deposits impair not only the free wheeling and guidance of the machine parts, but also have an adverse effect on the accuracy of the motion, which has negative consequences in particular for travel-controlled actuator drives such as are found in manipulators, for example. The actual motion then no longer comes as close to the computer specification as it should.

Hitherto, one has attempted in practice to solve this problem by covering the tracks with bellows-type boots. It is also known from German-OS No. 29 46 825 to cover the tracks with two blinds which can be wound up and unwound and which are connected to the movable machine part. The blinds, however, have the disadvantage of being able to cover the tracks from the top only and not from the sides and, moreover, of being sensitive and susceptible to trouble. The bellow-like boots are not satisfactory either because they are associated with considerable space and cost requirements and with a not inconsiderable susceptibility to trouble.

Furthermore, it is known from German Pat. No. 11 01 096 to cover the rack of a drill spindle sleeve with a belt, but to leave the guide surfaces of the drill spindle sleeve unprotected and to wipe dirt accumulations off the drill spindle sleeve by means of sealing lips on the guiding means of the other machine part. Such a measure is inadequate for highly precise drives because such seals are suited for rotation symmetrical guiding means only, and also because they wear and become useless relatively quickly.

SUMMARY OF THE INVENTION

Accordingly, it is an object of the invention to protect the tracks of the two machine parts mounted so as to be movable longitudinally relative to each other from deposits in a different and simpler manner.

The invention solves this problem by using a belt that lies over an open slot on a guide channel, the channel being otherwise closed and containing guiding means for the machine parts.

In this way, the guiding means of the two machine parts are disposed in a guide channel completely closed towards the outside, thus making it impossible for dirt particles like dust, grease, oil or the like to reach the guiding means and a rack possibly present therein. To make a relative motion of the two machine parts possible, the guide channel to the one machine part must have a slot through which the guide elements of the other machine part protrude. This slot is covered partly by the housing of the other machine part whose guide elements protrude into the channel. In the other areas, the slot is closed by the covering belt placed on it. The slot is thus covered completely, also in all travel positions of the machine parts.

The protective device according to the invention does not depend on whether the one machine part is being moved relative to the other or vice versa and on how the drive is designed. By the same token, it is immaterial for the protective device whether the rigid guide track is disposed on the moved or on the stationary machine part and the guide elements on the respective counterpart. To keep the masses to be moved as small as possible, it is recommended, of course, to dispose the guide track on the stationary and in the generally longer machine part and to provide the guide element on the moved, usually shorter machine part.

It is particularly advantageous when the protective device is combined with the drive of the machine parts in that a toothed belt is provided as the covering belt. The toothed belt may either be fixed stationarily or move in revolving fasion. Depending on the embodiment, the drive will then be on the moving or on the stationary machine part.

In connection with the application, the differentiation between stationary and moving machine part relates only to the relative motion between the two parts. The "stationary machine part", in turn, may be movably mounted to a third machine part. This would be the case in a cross slide drive, for instance.

Besides the particularly advantageous embodiment using the toothed belt drive, any other drive system such as a rack drive, a friction wheel drive, a linear motor or the like, may be provided the drive.

Depending on the embodiment of the guide track and the guide elements, the protective device itself may be of different design. In order to open the guide channel for the engagement of the guide elements of the other machine part it is generally advisable, however, to lead the belt between two tension rolls in a loop across a deflection roller and thus raise it off the guide channel. In the case of a stationary toothed belt this deflection roller is designed as drive pinion. The measure of leading the belt in a loop, by the way, is independent of which one of the machine parts is the moving one and which one is the stationary one.

In the embodiments of the invention shown, the stationary machine part contains the guide channel which is covered by the belt, in particular a toothed belt, in a through channel in the longitudinal direction and is engaged by the guide elements disposed on the other, moving maching part.

In one embodiment at least two ballscrew pairs that are arranged in series are provided as the guide elements. They involve commercial bearings usable especially for structural parts guided linearly. The balls of these bearings are guided in a straight line over a not inconsiderable distance until they enter a semicircular which again becomes a straight return track. It is common practice in such known ballscrew pairs for its basic body in which the balls are guided to be fastened, in particular screwed, to the other part. The one part then has a guide groove engaged by the balls. In this arrangement it is advisable to dispose the basic body on the moving machine part and the guide groove in the stationary machine part.

Since it is intended in the invention to guide the other machine part along the first machine part over a possibly long distance, it follows that the guide elements provided in accordance with the invention must be arranged so that the danger of the moving machine part tilting is eliminated. This leads to the paired arrangement of at least two guide elements, in particular ballscrew bearings provided one behind the other.

So that these ballscrew bearings will be adjustable to have as little play as possible, the invention provides in the scope of one embodiment that the ballscrew bearings belonging to one pair are supported by a shoulder of the other machine part located between them and that the guide channel of the first machine part is formed by two guide strips, the mutual spacing of which is adjustable. Therefore, the other machine part with its guide elements can be inserted into the guide channel in order to eliminate thereupon all backlash of the guide system by adjusting one of the two guide strips of the first machine part.

According to various embodiments, the guide channel may be formed by the two guide strips whose guide slots are then directed inwardly opposite each other. In variation thereof it is also possible to have the guide slots of the two guide strips face outwardly.

In that case, the guide channel is formed by two webs which are mutually spaced laterally and project upwrdly outside of the guide strips and on which the belt rests.

In another embodiment of the invention the guide track is designed as a flat, horizontal sword with lateral treads beveled in truncated cone shape with which laterally disposed, correspondingly profiled guide rollers are in vertically and horizontally form-closing engagement. In this case, the guide channel is formed by lateral sheet metal covers, leaving free between them a slot covered by the belt. The guide channel formed by the sheet metal covers, however, may also be employed in other kinds of guide systems.

There results from the solution according to the invention, in which a toothed belt covers the guide channel slot, an additional problem which has to do with the fact that, due to its teeth, the toothed belt has laterally accessible connecting channels to the guide system in the covered area through which dust, grease or the like can enter the guide system by and by, even though not immediately. To avoid this effect, contact shoulders or toothed strips are provided on the outside of the guide channel. But it is also possible to construct the toothed belt of a wide carrier belt and a toothed strip narrower than the former. In this case, the toothed strip engages the slot of the guide channel while the wider carrier belt rests outside on the edges of the guide channel, thus covering the slot. The toothed belt can thus also be moved relative to the guide channel and is suited for both drive variants of the toothed belt drive.

The profiled cross-sectional design of the belt with its centering engagement of the slot can also be used to advantage for other smooth belts without a tooth strip.

Use of the subject invention is possible in many ways. Therefore, the invention also includes the idea of the multiple arrangement of the protective device according to the invention is a manipulator generating two or three-dimensional motions. There, the use of the toothed belt drive is of particular advantage. The invention also comprises many variants, according to which it is also possible to install on one machine part more than one protective device for a protective device in conjunction with a toothed belt drive in that, for example, two other machine parts are to be movably guided and driven independently to each other.

Details of the invention follow from the drawings. In the drawings, the invention is depicted schematically and by way of example.

DESCRIPTION OF THE PREFERRED EMBODIMENTS

Figure 1:
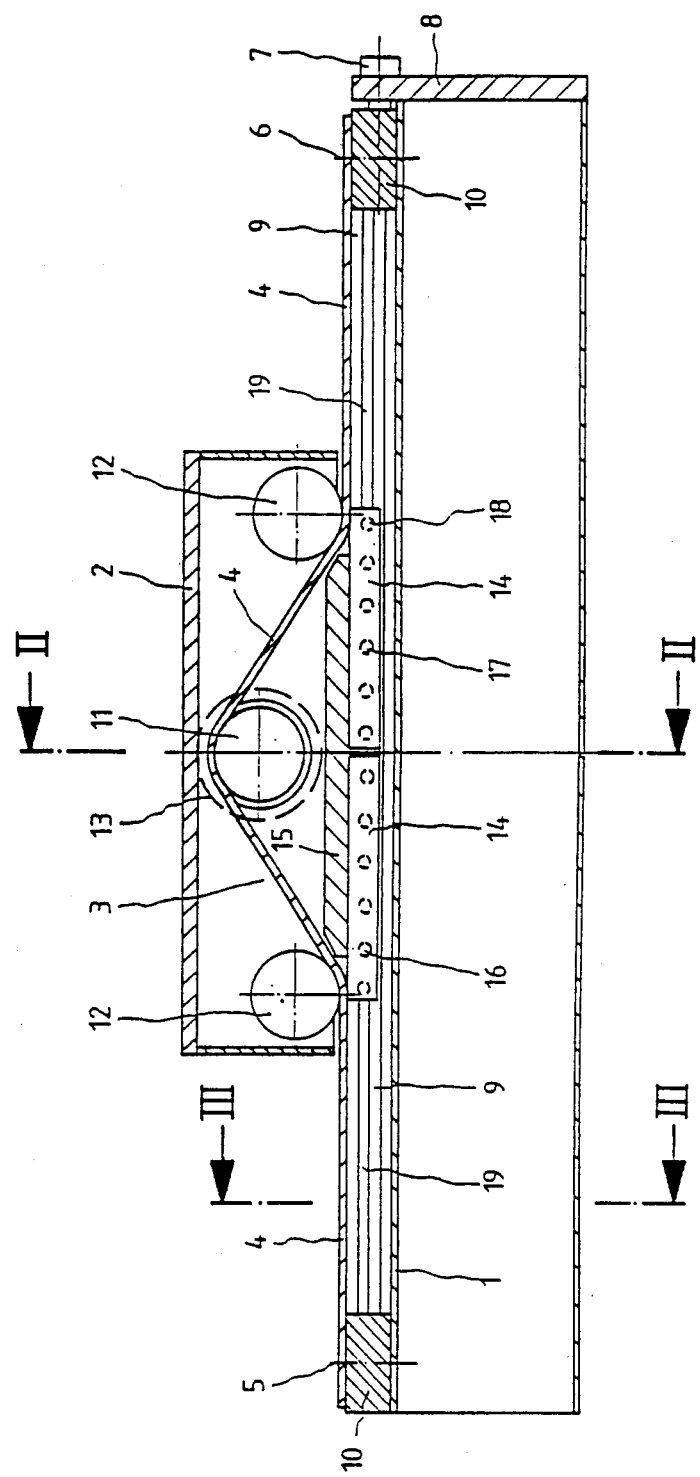
FIG. 1 a longitudinal section of two machine parts movably guided relative to each other, with toothed belt drive and ballscrew guidance.
Figure 2:
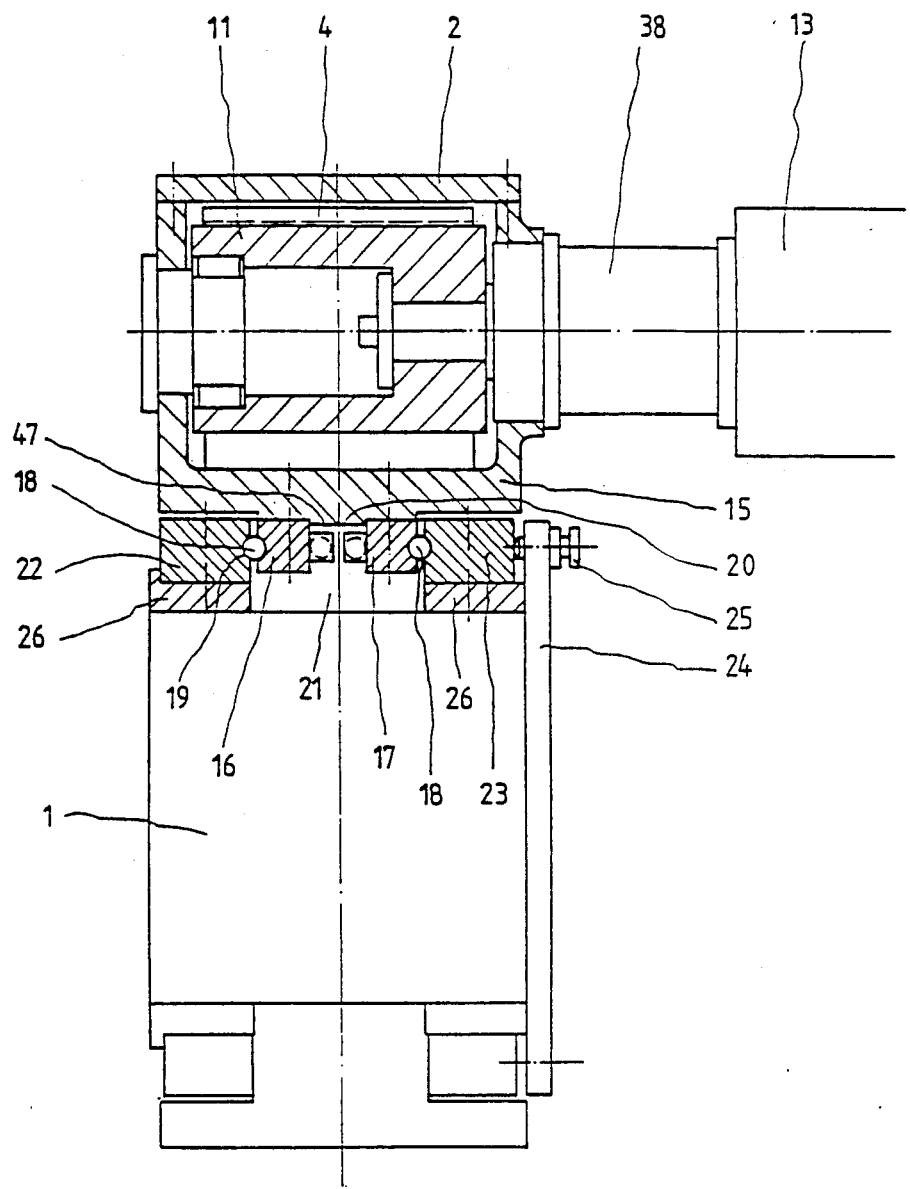
FIG. 2 is a transverse section along line II—II through the arrangement of FIG. 1.

It is assumed in the embodiment of FIGS. 1 and 2; that the one machine part 1 is designed, for instance, as a stationary beam whereas the other machine part 2 is guided on the first machine part 1 so as to be moved lengthwise and is designed as a tool holder, for example. It goes without saying that the motion can be reversed without problem.

In order to bring about the motions of the two machine parts 1, 2 relative to each other a toothed belt drive 3 is used which comprises a toothed belt 4 disposed in the embodiment of FIG. 1, stationarily on the first machine part 1. The fasteners 5, 6 at the ends of a guide track 9 provided in this machine part 1, serve this purpose. Since such a toothed belt 4 must have a defined tension there is provided in the embodiment example of FIG. 1, tension means 7 shown symbolically in the area of fastener 6. Tension means 7 are connected between blocks 10,10 of fasteners 5, 6, and with plate 8, can tension the belt 4 along the guide track 9. The block 10 in the area of fastener 5 is stationary.

This tension means 7, in fact, is illustrated symbolically only. It may be replaced by a great variety of designs which bring about a lengthwise motion of block 10 in the area of fastener 6 such as by rotary motions via threads and the like.

The toothed belt 4 is led across a drive pinion 11 mounted in the other machine part 2 and connected to a drive motor 13. The purpose of the two tension rolls 12 is to bring the bulge of the toothed belt 4 caused by the drive pinion 11 into a plane parallel to the first machine part 1.

In the triangle formed by leading the toothed belt across the drive pinion 11 and under the tension rolls 12 there are fastened to the other machine part 2 guide elements 14 engaging the guide track 9 of the first machine part 1. Fastening purposes are served, for example, by the bottom 15 which is a fixed component of the other machine part 2, but moves above the upper edge of the first machine part 1. To prevent a tilting motion of the other machine part 2, the invention provides for the paired arrangement of several guide elements 14 in series.

In the embodiment to be described later the invention provides for the use of socalled ballscrew bearings 16, 17. In these bearings 16, 17 balls 18 are led in a straight line over a not inconsiderable distance and return via circular deflection tracks and a return track between them into their original starting position. For this reason, such ballscrew bearings 16, 17 are particularly well suited to allow linear motions with perfect guidance. The series arrangement of such ballscrew bearings 16, 17 leads to particular stability of the guidance system.

It is shown further in the example of FIG. 1 that the balls 18 of the guide elements 14 or ballscrew bearings 16, 17 engage guide grooves 19 which form part of the first machine pat 1 or its guide track 9.

It may be seen from the transverse section of FIG. 2 that the drive motor 13 is flanged laterally to the other machine part 2, driving the drive pinion 11 either directly or through the interposition of a transmission 38.

The other machine part 2 is designed in the form of a housing. The bottom 15 of this housing 2 has a shoulder 20 against which the two ballscrew bearings 16, 17 are fed. Their balls 18 engage the guide grooves 19 located on guide strips 22, 23 which form part of the first machine part 1. One guide strip 22 is supported stationarily by a seating strip 26. The other guide strip 23 is movable transversely by means of clamping means 25. Clamping means 25 acts through balls 18 upon the associated ballscrew bearing 17 and braces these bearings 16, 17 against the seating strip 26 via the shoulder 20 and the guide strip 22. This removes all backlash. The clamping means 25, which may be of any design, is supported by a plate 24 rigidly connected to the first machine part 1.

Between the two guide strips 22, 23 a guide channel 21 is formed which is closed completely except for a longitudinal slot 47 and into which the ballscrew bearings 16, 17 protrude which, in turn, are stationarily joined to the other machine part 2.

Figure 3:
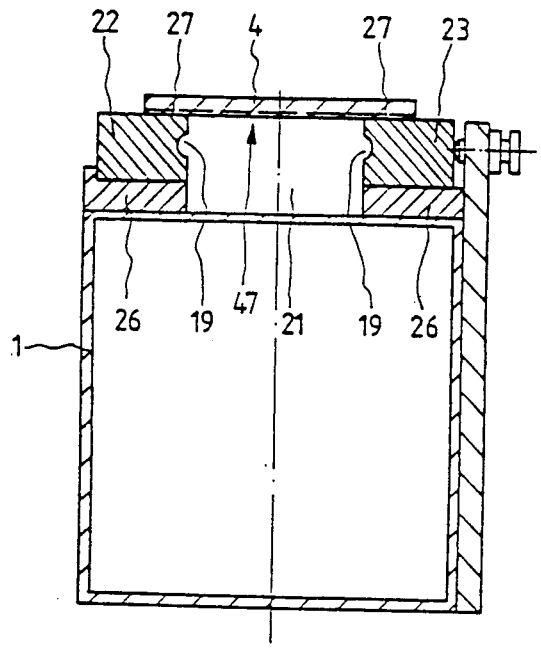
FIG. 3 is a transverse section along line III—III through the arrangement of FIG. 1.

The example of FIG. 3 shows how the toothed belt 4 covers the guide channel 21 or the slot 47, and that in a position away from the location of the other machine part 2. The two guide strips 22, 23 on sides of slot 47 are covered from the outside by the toothed belt 4 at least partly. 27 designates the surfaces of the toothed belt 4 in contact with the guide strips 22, 23.

It is unmistakable in this position per FIG. 3 that free access to outside air, including its components, to the guide channel 21 is possible from the side through the tooth gaps in the toothed belt 4.

Figure 4:
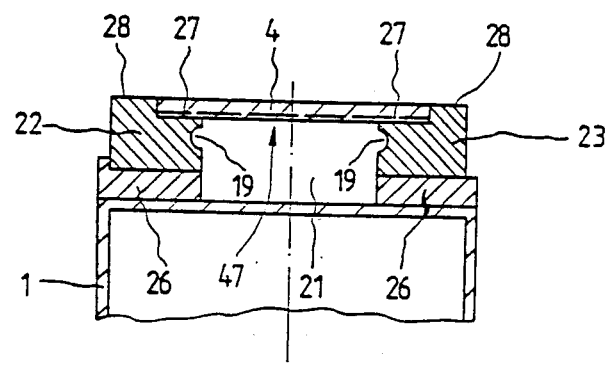
FIGS. 4 and 5 is transverse sections of the guide channel of FIG. 3 showing two variants thereof.
Figure 5:
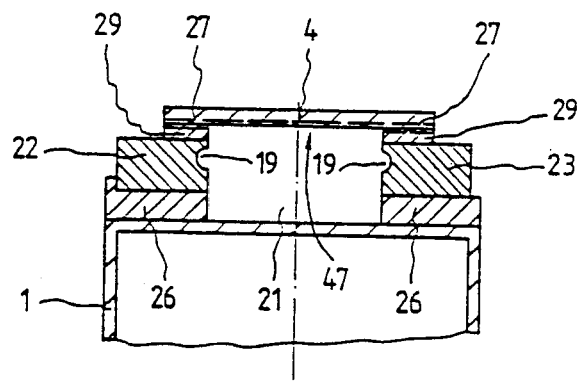

FIGS. 4 and 5 show suggestions by way of example how to forestall this possibility.

In the embodiment of FIG. 4 the contact surface 27 of the individual guide strips 22, 23 is limited laterally by raised surfaces or shoulders 28 so that the tooth gaps in the toothed belt 4 are covered up laterally. The embodiment example of FIG. 5 provides that toothed strips 29, which may also be belts, are provided in the guide strips 22, 23 in the area of the contact surfaces 27. Their teeth match the teeth of the toothed belt 4. In this manner the tooth gaps in the toothed belt 4 are closed without the necessity of taking special measures on the guide strips 22, 23 to close the tooth gaps.

In the example of FIG. 2 it is shown that the ballscrew bearings 16, 17 are fastened to the movable machine part 2, which leads to the fact according to FIG. 3, that the toothed belt 4 is supported only at its edges.

Figure 6:
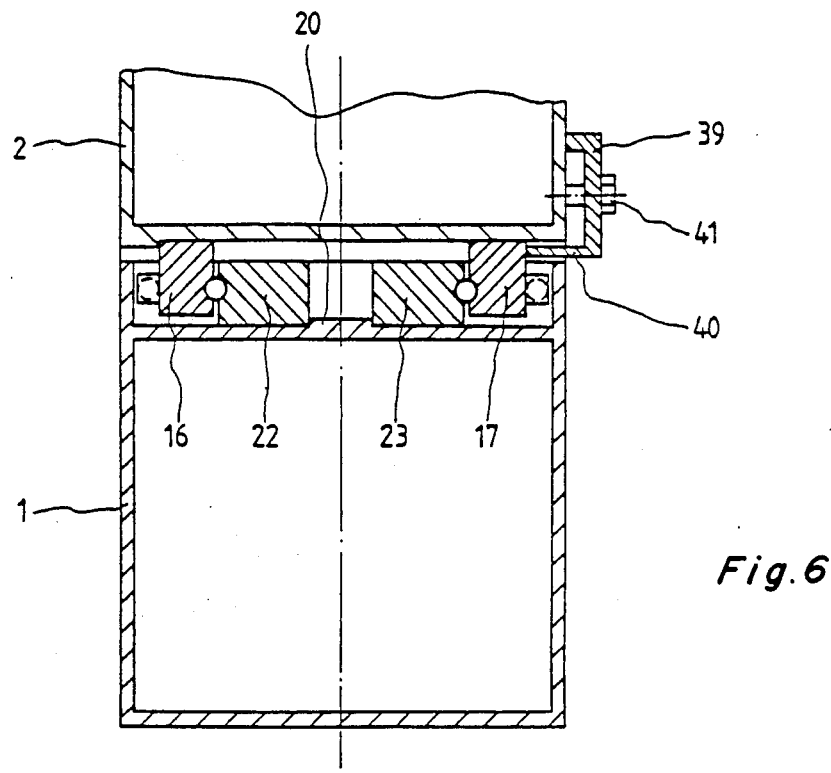
FIGS. 6 and 7 are transverse sections of another embodiment for the ballscrew guidance.
Figure 7:
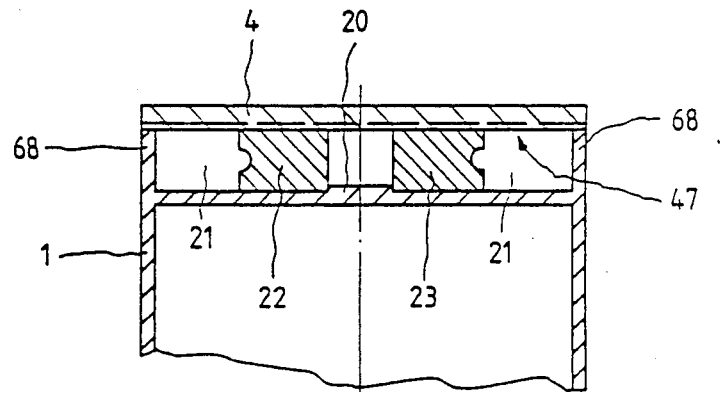

FIGS. 6 and 7 show the reverse of the arrangement of FIG. 2. It will be found when comparing FIG. 7 with FIG. 3, that, in the arrangement of FIGS. 6 and 7, the toothed belt 4 is supported not only in the edge zone by vertical webs 68, but also in the center by resting on the guide strips 22, 23. The guide channel 21 is thus formed by the two vertical webs 68 and the cross web of the machine part 1.

The elimination of backlash in the guide system is brought about by clamping jaws 39 whose leg 40 pushes the ballscrew bearing 17 and the guide strip 23 against the shoulder 20 of machine part 1 while the screw 41 pulls the machine part 2 towards it, thus bracing the ballscrew bearing 16 and the guide strip 22 against this shoulder 20.

Figure 8:
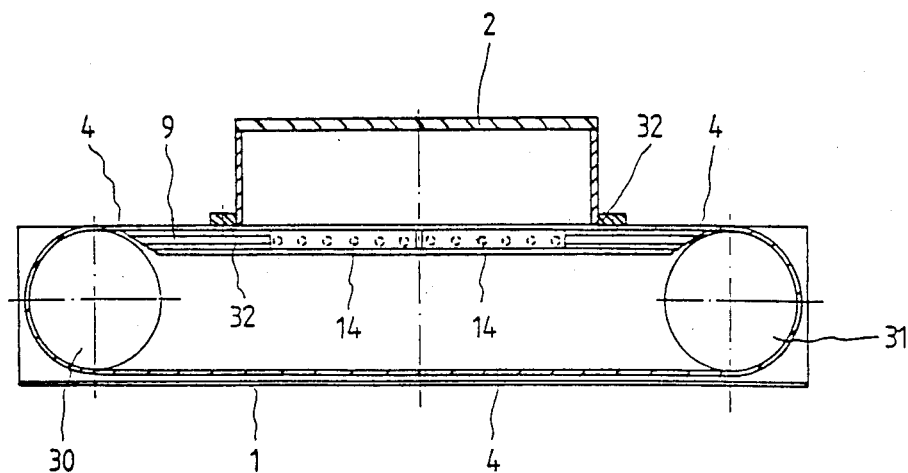
FIG. 8 is a schematic longitudinal section of another embodiment of the invention

In the embodiment of FIG. 8 an independent solution of the problem posed is disclosed. According thereto, two wheels 30, 31, of which wheel 31 is driven by a drive motor (not shown), are rotatably mounted in the first machine part 1 at the end of the guide track 9. The toothed belt 4 is led across these two wheels 30, 31. Its ends 32 are firmly attached to the other machine part 2. The guide elements 14 of this other machine part 2 protrude into the guide track 9 of the first machine part 1 with the consequence that the guide system 9, 14 is again covered by the toothed belt 4 or by the other machine part 2.

It is obvious that the subject illustrated in FIGS. 1 to 7 or 8 can only be a basic element which can be combined arbitrarily with other basic elements of the same kind to thus arrive at a multidimensional motion of parts guided on one another.

Figure 9:
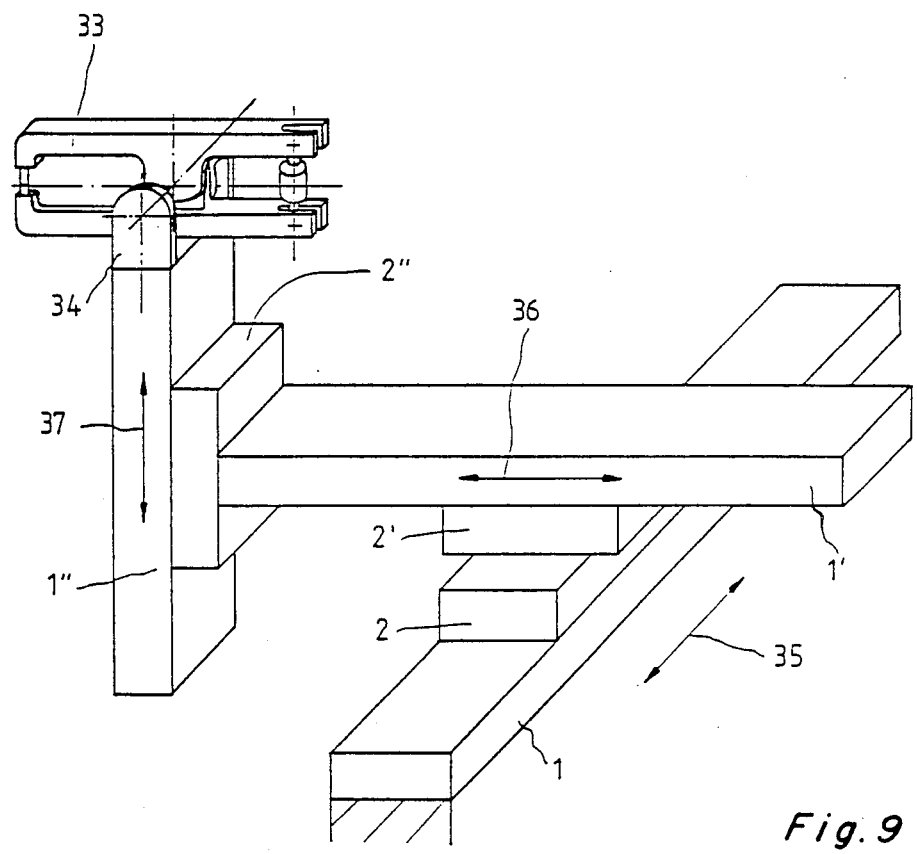
FIG. 9 is a schematic perspective view of how to connect numerous machine parts for multidimensional motions.

Such a combination is shown in FIG. 9 as one of many possibilities. According thereto, the first machine part 1 is mounted stationarily in any desired manner or on the floor. The other machine part 2, guided in the machine part 1 so as to be movable along arrow 35, is movably attached to this machine part 1.

Now, this other machine part 2 supports a machine part 2', on which a machine part 1' is movably guided along arrow 36. This arrangement 1, 1', 2, 2' forms the precondition for the two dimensional motion of a tool 33, such as one mounted at the end of machine part 1'.

But beyond this, FIG. 9 shows that at the end of machine part 1' a machine part 2" which guides the machine part 1" in the direction of arrow 37 can be provided. As already said earlier it is totally immaterial where the drive motor 13 for the individual machine part is provided. In the example of FIG. 9 it is further shown that there is at the upper end of machine part 1" a holder 34 in which the tool 33 is movably guided in any manner. Depending on which job the tool 33 is to perform, the holder 34 will have to be designed accordingly, e.g. to mount a welding tongs or another welding tool, a pressing device, a chip removing cutting tool, etc.

But in all cases there is assurance that the guidance system 9, 14 of the individual elements is protected by the toothed belt 4 against the deposit of dust and the like.

It presents no problem to vary the embodiments of FIGS. 1 through 7 to the effect that instead of the toothed belt drive 3 a rack drive according to German-OS 11 01 096 or another drive is selected. The rack would then be disposed between the guide strips 22, 23 at the bottom of the guide channel 21 on the machine part 1, for instance. Contrary to FIG. 1, the ballscrew bearings 16, 17 would then have to be moved apart a little to provide room between them for the drive pinion.

Figure 10:
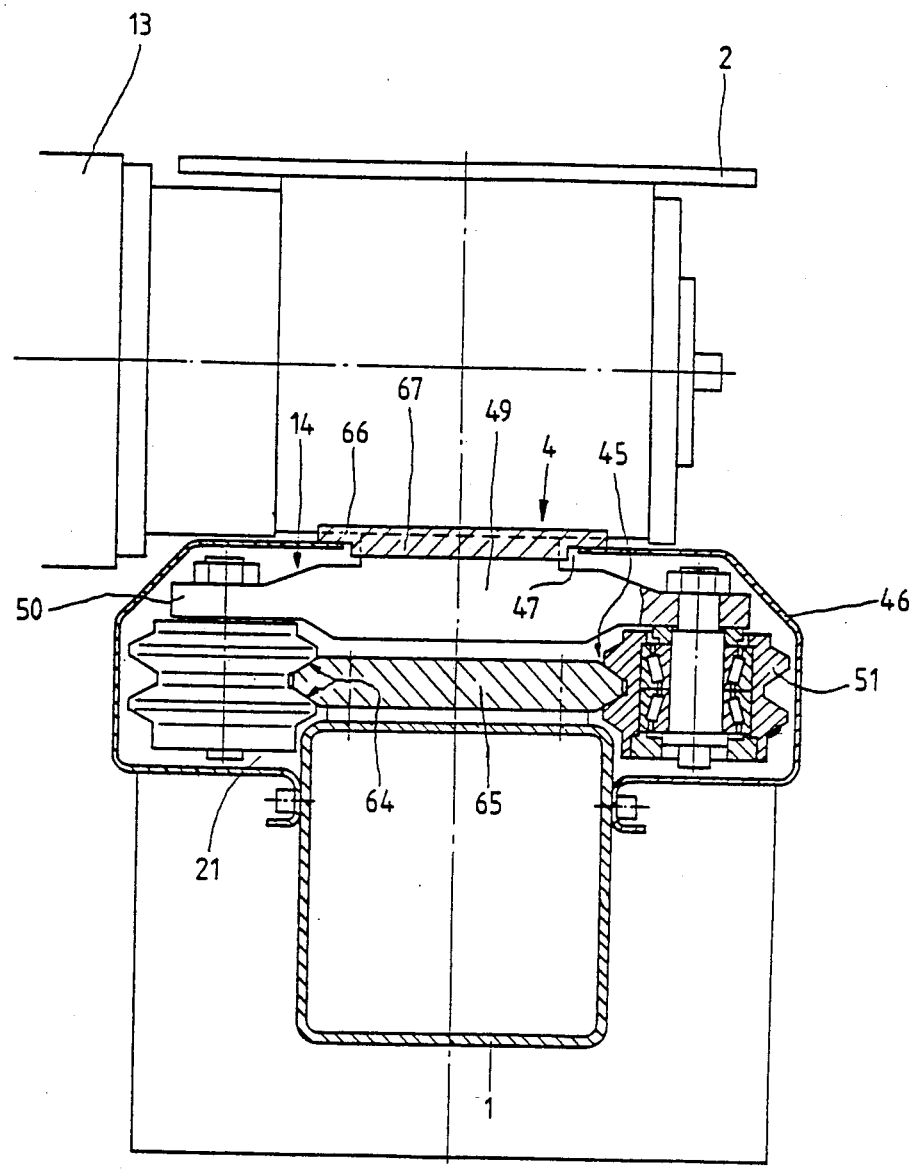
FIG. 10 is a transverse section of an arrangement similar to FIG. 1 with a roller bearing guidance.

FIG. 10 shows another variation of the protective device, as may also be used in connection with the embodiments of FIGS. 1 through 8.

A guide track 45 is disposed in the guide channel 21 which is completely closed except for an upper, longitudinal slot 47 and which is formed by lateral sheet metal covers 46 fastened to the machine part 1.

The moving machine part 2 has a carriage frame 49 which engages the guide channel 21 through the slot 47 in the area below the belt loop (see FIG. 1), continuing below the slot 47 in longitudinal direction. This makes for a long supporting length for the tilt-free guidance of the machine part 2. The carriage frame 49 has at both its ends, or also in places in between, lateral extensions 50 on which guide rolls 51 are rotatably mounted which engage treads 64. The guide rolls 51 have a form-closing counterprofile to the treads 64, and each consists of two single rolls of truncated cone profile rotatably mounted on a guide pin and preloaded against each other. This makes it possible to eliminate all backlash between the guide rolls 51 and the treads 64. Due to the profiling of the guide rolls 51 and threads 64 an adjustable guidance system of minimal size and form-closing on all sides is achieved.

As is evident from FIG. 10, the sheet metal covers 46 grip around the guide rolls 51, the extensions 50 and the carriage frame 49. Such a guide channel 21, formed by appropriately shaped sheet metal covers 46, can also be combined with other kinds of guidance systems. For instance, the profiled guide rolls 51, rotating about a vertical axis, may each be replaced by three individual rolls gripping around three sides of a sword 65 which is rectangular in cross-section. A transfer to the embodiments of FIGS. 1 through 8 is also possible.

FIG. 10 also shows another kind of belt design. The toothed belt 4 consists of a wide carrier belt 66 and a toothed strip 67 narrrower than the former. The width of the toothed strip 67 has been selected so that it is guided in the slot 47 with adequate clearance. In contrast thereto, the width of the carrier belt 66 has been selected so that the toothed belt 4 rests without deforming on the rims of the guide channel 21. If a rack drive is used, the belt 4 is designed as a smooth belt with a smooth shoulder 67 instead of the rack.

According to the embodiments of FIGS. 4 through 5, shoulders 28 or toothed strips 29 may also be provided on the sheet metal covers 46 on both sides of the slot 47.

I claim:

1. A device for protecting guide means between first and and second machine parts which are mounted to each other for relative movement, comprising the first machine part having a guide channel extending in a longitudinal direction of relative movement between the first and second machine parts, the guide channel being completely closed except for a longitudinal slot extending in a longitudinal direction, a guide track in said guide channel extending in a longitudinal direction, a plurality of guide elements connected to the second machine part and engaged with the guide track for movement of the second machine part in the longitudinal direction with respect to the first machine part, said guide elements extending through said longitudinal slot, the second machine part always covering at least a portion of said longitudinal slot, the first machine part having guide strips on the outside thereof and on opposite sides of the longitudinal slot which extend in the longitudinal direction, a toothed belt having a finite length and opposite ends, one end of said toothed belt being fixed to the first machine part at one longitudinal end of the first machine part and the opposite end of said toothed belt being fixed to the first machined part at an opposite logitudinal end of the first machine part, said toothed belt being engaged over said guide strips on the outside of the first machine part and covering all portions of said longitudinal slot from the outside except for the portion of the longitudinal slot covered by the second machine part so that the longitudinal slot is completely covered by said toothed belt and by the second machine part, a pair of spaced apart tension rollers rotatably mounted to the second machine part at locations spaced in the longitudinal direction for engaging and tensioning said toothed belt, and a toothed drive pinion acting as a deflection roller for engaging said toothed belt, said pinion being mounted for rotation to the second machine part between said tension rollers with rotation of said pinion causing movement of the second machine part on the first machine part, the second machine part having a housing which contains pinion and said tension roller.

2. A device according to claim 1 wherein said guide elements each comprise a ballscrew bearing connected in series along the longitudianl direction to the second machine part.

3. A device according to claim 2 wherein the toothed belt is wrapped over said pinion and under said tension rollers to form a loop of the toothed belt.

4. A device according to claim 3 including adjustment means for adjusting a spacing between said guide strips, said ballscrew bearings being mounted for sliding in a longitudinal direction between said guide strips.

5. A device according to claim 1 wherein the first machine part has a contact shoulder at each side of said longitudinal slot, said belt guided between said contact shoulders, said contact shoulders covering sides of said belt.

6. A device according to claim 1 wherein, each guide strip has an upper surface which is at least partly covered with teeth extending in the longitudinal direction and matching teeth of said belt, said belt teeth being engaged with said guide strip teeth.

* * * * *